United States Patent [19]
Olson

[11] Patent Number: 4,995,344
[45] Date of Patent: Feb. 26, 1991

[54] APPARATUS FOR CLEANING WITH AQUEOUS SOLUTION

[76] Inventor: Anita D. Olson, 3106 Hwy 169 So., Grand Rapids, Minn. 55744

[21] Appl. No.: 440,520

[22] Filed: Nov. 22, 1989

[51] Int. Cl.⁵ .................. A01K 13/00; A46B 11/04
[52] U.S. Cl. ........................... 119/85; 401/201; 401/183
[58] Field of Search ............... 401/186, 183, 163, 153, 401/270, 184, 264, 272, 291, 283; 119/85, 83

[56] References Cited

U.S. PATENT DOCUMENTS

| | | | |
|---|---|---|---|
| 288,770 | 5/1959 | Carolonza | 401/186 |
| 489,697 | 1/1893 | Taylor | 401/183 |
| 2,952,027 | 9/1960 | Caldwell | 401/184 X |
| 3,556,667 | 1/1971 | Kaufman | 401/291 |
| 3,597,098 | 8/1971 | Kellis | 401/186 X |
| 4,143,667 | 3/1979 | Peilet | 401/183 |
| 4,237,822 | 12/1980 | Kaiser | 119/85 |
| 4,312,598 | 1/1982 | Vagner | 401/272 |
| 4,617,875 | 10/1986 | Holland | 119/85 |

FOREIGN PATENT DOCUMENTS 345868  6/1960  Switzerland .................. 401/183

OTHER PUBLICATIONS

Grooma Groomer Advertizing Literature of White Horse Trading Co., Louisville, KY, undated.

Primary Examiner—Richard J. Johnson
Attorney, Agent, or Firm—Henry C. Kovar

[57] ABSTRACT

A method and apparatus for scrubbing mammals and inanimate objects having a cover with a handle and a tubular section, a perforate scrubbing platen with a finger or sponge or abrasive or other structure to contact the mammal or object, a scrubbing compound holder inbetween the cover and platen, and a central scubbing drive strut and socket structure that enables the platen to move toward the cover to expell scrubbing compound during use and to move away from the cover during use to intake diluent. The method uses the device and has the steps of expelling compound and intaking diluent.

9 Claims, 1 Drawing Sheet

APPARATUS FOR CLEANING WITH AQUEOUS SOLUTION

BACKGROUND OF THE INVENTION

1. Field of the Invention

This invention pertains to a method of an apparatus which is to be hand held during washing and cleaning with an aqueous solution. The method and apparatus are particularily well suited for working and cleaning mammals such as horses, agricultural stock and pets.

2. The Prior Art

People have washed horses and other mammals and the objects that they own or use since antiquity. Scrubber devices and brushes are well known. When animals are currently washed, the present technique is a bucket of soap water and a scrub brush or some type of a scrub device with pliable fingers. At best, washing has been a sloppy process and too much soap or cleaning solution has been used.

High pressure sprayers are now commonly used to wash horses, however, these sprayers will not penetrate the hair and will not clean the animals skin. A soap/-treatment compound does not penetrate and a reuse solution does not penetrate. Even with a pressure sprayer, manual effort is required to cleanse and/or effectively treat the skin of the horse.

A particular prior art device is the commonly seen windshield washer device in vehicle service stations. The windshield washer device is generally T-shaped with the leg of the T being the handle. The top of the T has a squegee on one side and the second side has an elongate length of open cell foam enclosed by the combination of a rigid cross-frame and an open plastic net. The foam holds a cleaning solution provided pre-mixed in a bucket and the plastic net provides a non-scratching abraider to remove bugs and the like from windshields. The foam is loaded with solution through the net, and also discharges the solution through the net. There is no provision for changing of the foam element or for changing the plastic net to some other abraider element. The windshield washer device is not usable on animals.

OBJECTS OF THE INVENTION

It is an object of this invention to provide a new method and apparatus for hand washing an animal or an inanimate object.

It is an object of this invention to provide a new method and apparatus for manual scrubbing of a mammal wherein a hand held scrubbing device carries a supply of scrubbing compound.

SUMMARY OF THE INVENTION

A manual scrubbing device has an imperforate top and a tubular section and a handle, an open cell solution sponge inside of the tubular section, a scrub member having a perforate platen retained to the cover, and lateral positioning structure connecting the platen to the top member to transversely position the platen with respect to the cover while enabling the platen to move toward and away from the cover top.

A mammal scrubbing device has a cover with a handle and a top, a scrub member with a pliable perforate platen, a generally tubular section connecting the platen to the top, scrubbing compound holding structure in between the platen and the top, and structure between the top and the platen for moving the platen in a transverse scrubbing movement and enabling the platen to move toward and away from the top to discharge scrubbing compound and intake diluent.

A method of scrubbing with a scrubbing device having an imperforate cover, a perforate scrubbing platen and a compound holder between the cover and platen, have the steps of driving the platen transversely with the cover, and moving the platen toward the cover during use to discharge compound and away from the cover during use to take in diluent.

DESCRIPTION OF THE PREFERRED EMBODIMENT

Figure 1:
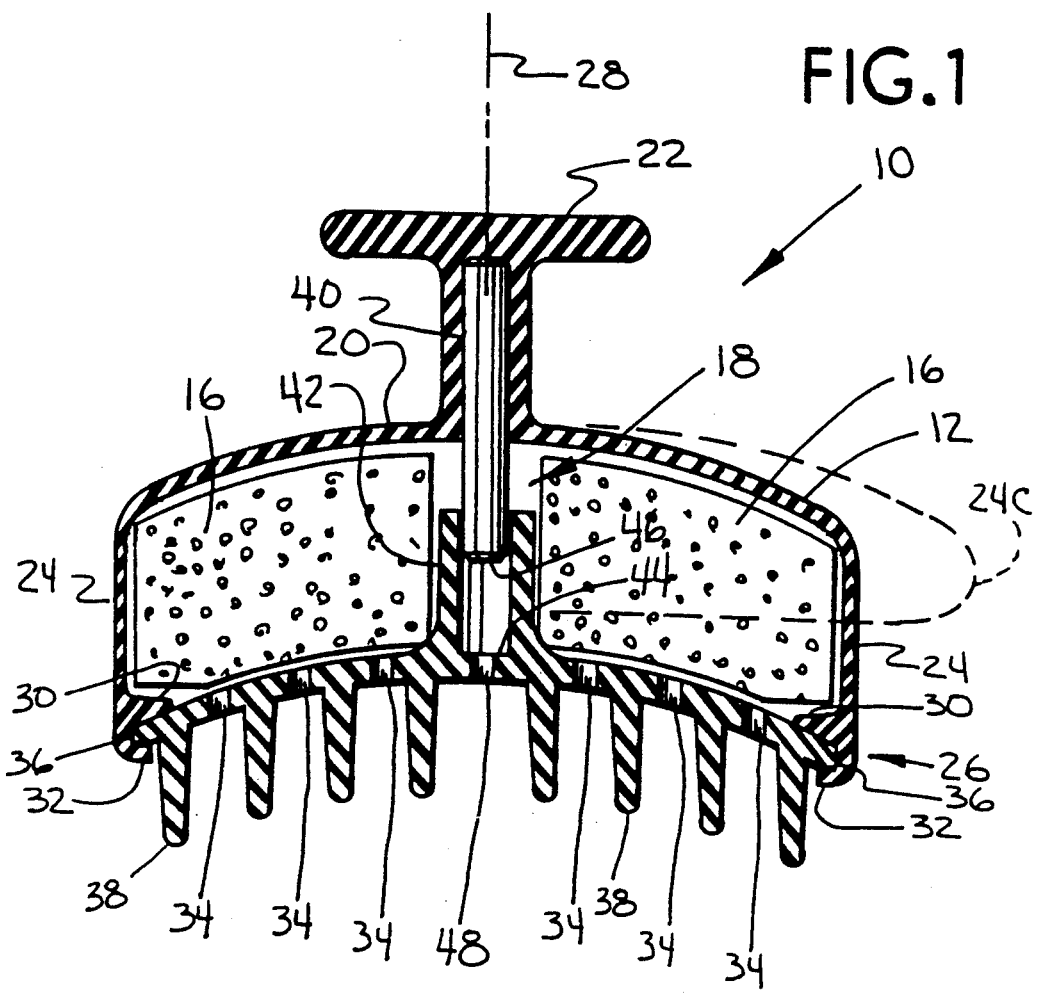
FIG. 1 is an elevational view in section of the preferred embodiment of a scrubbing device according to the present invention.

According to the principles of the present invention, a scrubbing device is provided as shown in FIG. 1 and generally indicated by the numeral 10. The scrubber 10 has a cover member 12, a scrubbing platen, 14, a scrubbing compound holder 16, and a drive and positioning structure 18 for the platen 14.

The cover 12 has a top member 20, a handle 22, a generally tubular section 24 and a platen retainer 26. The top member 20 and tubular section 24 are imperforate and the tubular section 24 is preferrably round with the handle 22 and positioning structure 18 being centered upon a relatively upright axis 28 of the device 10. The platen retainer 26 is on the perimeter of the cover 12 and on the bottom of the tubular section 24. The platen retainer 26 extends completely around the cover 12 and includes a continuous circumferential upper platen stop 30 and lower platen snap-tabs 32 which are preferrably segmented but may be continual and completely circumferential. The tubular section 24 is resiliently collapsible to a collapsed configuration shown in dotted lines as 24C in FIG. 1, and is preferrably of thinner wall section than the top member 20.

The platen 14 is generally planar but preferrably has a slight dome shape as shown to be slightly convex from below. From the lower side the platen 14 is perforate and has a plurality of apertures 34 inside of a perimeter 36 which is snapped into the retainer 26. The preferred platen 14 has a plurality of fingers 38 for scrubbing the hair and skin of a mammal. While the platen 14 is shown as being slightly convex in its normal configuration, the platen 14 is resiliently flexible and is of an elastomeric or TPR material. The platen 14 and the scrubbing fingers 38 will resiliently and compliantly conform to the contour of the mammal or object being scrubbed.

The scrubbing compound holder 16 is an open celled sponge core and has a toroidal shape that surrounds positioning structure 18 and which completely backs up the platen 14. The holder 16 is removable and snaps inside of the platen retainer 26.

The positioning structure 18 has an upright elongate center strut shaft 40 which is fixed in the cover 12 and which preferrably extends upward into the handle 22. The other part of the structure 18 is an strut socket 42 which is slip-fitted on to the strut shaft 40. In the bottom of the socket 42 is a stop 44 which will abutt against the shaft lower end 46, and a vent aperture 48. The socket 42 is free to travel up and down on the shaft 40 a distance of at least 1/3 the height of the cover 12.

Figure 2:
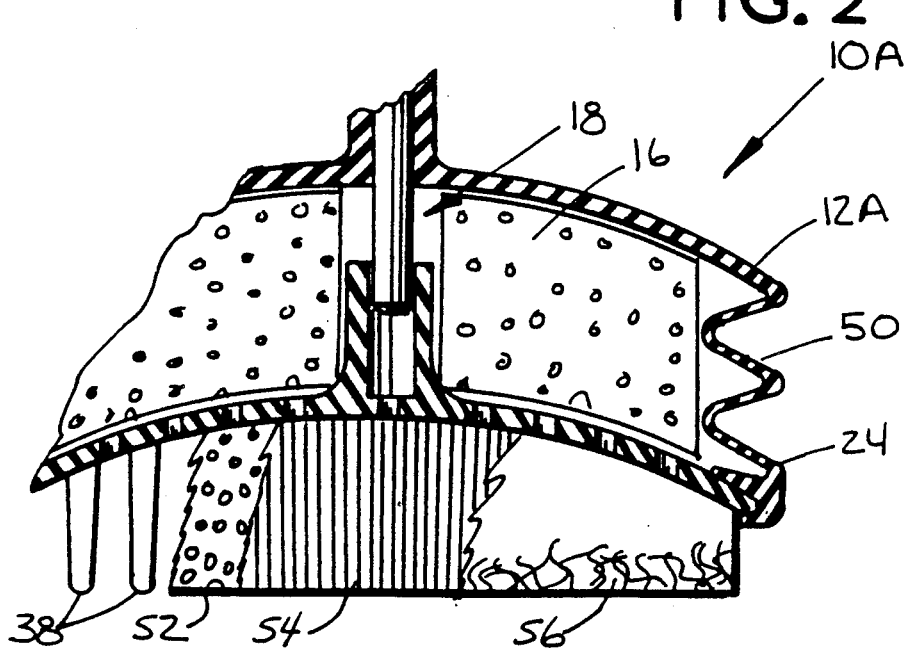
FIG. 2 is an elevational view in section of an alternative preferred embodiment of the scrubbing device.

FIG. 2 illustrates an alternative embodiment of the scrubber 10A having an alternative cover 12A wherein the alternative tubular section 24A has a collapsible peripherial bellows 50. The alternative scrubbing platen 14A may have an alternative scrubbing structure which may be sponge 52, brush 54, abrasive fiber 56 or other appropriate structure suitable for scrubbing mammals or inanimate objects such as vehicles, windows, siding, and the like. The bellows 50 provides resilient collapsibility of the tubular section 24. The first scrubbing platen 14 can easily be removed and replaced with an alternative scrubbing platen 14A having alternative scrubbing structure 52, 54, 56 thereon.

The internal compound holder 16 can also be easily removed and replaced with an second holder 16 having a different compound therein. Some of the compounds include soap, wax, topical medicines, shampoos, cleansers and the like.

In the operation and use of the scrubbers 10, 10A and in the practice of the method of the present invention, the holder 16 is loaded with scrubbing compound, either via pre-load or via immersion. The holder 16 can be loaded through the platen apertures 34. The holder 16 can be loaded by immersing the entire device 10 and repeatedly pressing the cover 12 down to draw compound through the apertures 34 and into the holder 16. The loaded device 10, 10A is then placed in the users hand. The shaft 40 and handle 22 will slip between the second and third or third and fourth fingers of the user who will probably have a garden hose in the other hand. The user wets down the mammal or object and presses the device 10, 10A against the surface to be washed. The top member 20 is pushed in as the tubular section 24 collapses and scrubbing compound is pushed out of the apertures 34 and through the platen 14. When pressure on the top member 20 is released, the resilient bias of the pliable platen 14 and the tubular section 24 pushes the top 20 back out. As the user moves the device 10 about in a scrubbing motion, the shaft 40 and socket 42 transversely drive and locate the scrubbing platen 14.

The cover 12 and platen 14 are preferrably elastomeric and a thermoplastic rubber (TPR) material is ideal for these components.

The device 10 is exceedingly useful for scrubbing and or topically medicating horses, agricultural stock such as cattle, goats and pigs and is also quite useable for human bathing and treatment. The device is also well adapted for scrubbing objects like cars, trucks, and planes. The device 10A is absolutely ideal for boats because it carries its own soap or cleaner charge.

Many other advantages, features and additional objects of the present invention will become manifest to those versed in the art upon making reference to the detailed description and accompanying drawings in which the preferred embodiment incorporating the principles of the present invention is set forth and shown by way of illustrative example.

Although other advantages may be found and realized and various modifications may be suggested by those versed in the art, be it understood that I embody, within the scope of the patent warranted hereon, all such embodiments as reasonably and properly come within the scope of my contribution to the art.

I claim as my invention:

1. A manual scrubbing device comprising
   (a) a cover member having an imperforate top member and a handle extending upward from the top member;
   (b) a scrub member having downward facing scrubbing means for contacting and scrubbing the hair and skin of a mammal, and a resiliently pliable perforate platen to which said scrubbing means is secured, said platen being positioned between said cover and said scrubbing means;
   (c) a resiliently collapsible tubular section connecting a perimeter of the platen to a perimeter of the top member;
   (d) compound holding means between said top member and said platen and within said tubular section for holding an aqueous soluable scrubbing compound;
   (e) platen moving means operatively connected between a center of said top member and a center of said platen for enabling repetitive movement of the perforate platen toward and away from the top member and for transversely driving said platen in a scrubbing motion, in response to forces manually applied upon the handle; and in which
   (f) said platen moving means includes a strut which is normal to the platen and a socket slip fitted on the strut, said strut being fixed in one of the cover member or the platen.

2. The device of claim 1, in which said strut is fixed in and to the cover member.

3. The device of claim 1 in which a majority of the area of the platen is backed up by the compound holding means.

4. The device of claim 1, in which said strut is a rod affixed to the cover member, and in which said socket is affixed to said platen.

5. The device of claim 1, in which said tubular section has a wall thickness which is less than a wall thickness of said cover member.

6. The device of claim 1, including abutting stop surfaces on said strut and said socket.

7. The device of claim 6, in which said stop surfaces are disposed to provide up and down travel of the socket on the strut a distance which is at least 1/3 the height of the tubular section and the cover member.

8. The device of claim 1, including means for venting said socket.

9. The device of claim 1, in which said strut is fixed in said cover member and said handle.

* * * * *